US010414264B2

(12) United States Patent
Tamura et al.

(10) Patent No.: US 10,414,264 B2
(45) Date of Patent: Sep. 17, 2019

(54) IN-WHEEL MOTOR DRIVE DEVICE ASSEMBLY HAVING AN IN-WHEEL MOTOR DRIVE DEVICE AND A SUSPENSION DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/762,577

(22) PCT Filed: Sep. 16, 2016

(86) PCT No.: PCT/JP2016/077480
§ 371 (c)(1),
(2) Date: Mar. 23, 2018

(87) PCT Pub. No.: WO2017/057067
PCT Pub. Date: Apr. 6, 2017

(65) Prior Publication Data

US 2018/0272855 A1 Sep. 27, 2018

(30) Foreign Application Priority Data

Sep. 29, 2015 (JP) ................................ 2015-191700
Mar. 28, 2016 (JP) ................................ 2016-063622

(51) Int. Cl.
*B60K 7/00* (2006.01)
*B62D 7/18* (2006.01)
(Continued)

(52) U.S. Cl.
CPC ........... *B60K 7/0007* (2013.01); *B60B 27/00* (2013.01); *B60B 27/0026* (2013.01);
(Continued)

(58) Field of Classification Search
CPC .. B60K 7/007; B60K 7/00; B60K 2007/0061; B60K 17/043; B60K 2007/0038; B60G 2200/142
See application file for complete search history.

(56) References Cited

U.S. PATENT DOCUMENTS 5,087,229 A * 2/1992 Hewko ................ B60K 7/0007
180/65.51
7,350,605 B2 * 4/2008 Mizutani ............. B60K 7/0007
180/65.1
(Continued)

FOREIGN PATENT DOCUMENTS

JP 2004-090822 3/2004
JP 2006-240430 9/2006
(Continued)

*Primary Examiner* — Brian L Swenson
(74) *Attorney, Agent, or Firm* — Clark & Brody

(57) ABSTRACT

An in-wheel motor drive device (10) includes: a wheel hub bearing portion (11); a motor portion (21) and a deceleration portion (31) disposed in an upwardly offset manner with respect to an axis of the wheel hub bearing portion (11); and a carrier (101) projecting downward to a position below the wheel hub bearing portion (11). A suspension connection portion (**101*c*) is mounted on a lower end of the carrier (101), the suspension connection portion (101*c*) to be connected with a suspension device (116) so as to be directable in any direction. The suspension connection portion (101*c*) is disposed in an overlapping manner with the wheel hub bearing portion (11) with respect to a position in an axial direction of the wheel hub bearing portion (11**).

5 Claims, 11 Drawing Sheets

112
111
115
113
31,38
10
101b
11
107
21,25
102
36
122,123
101d
121
124
101
117
TOWARD FRONT SIDE OF VEHICLE
15
118,119
116
101c

(51) Int. Cl.

| | |
|---|---|
| ***B60B 27/00*** | (2006.01) |
| ***B60B 35/14*** | (2006.01) |
| ***B60B 27/04*** | (2006.01) |
| ***B60G 3/04*** | (2006.01) |
| ***B60G 3/06*** | (2006.01) |
| ***B60G 7/00*** | (2006.01) |

(52) U.S. Cl.

CPC .............. *B60B 27/04* (2013.01); *B60B 35/14* (2013.01); *B60G 3/04* (2013.01); *B60G 3/06* (2013.01); *B60G 7/008* (2013.01); *B60K 7/00* (2013.01); *B62D 7/18* (2013.01); *B60G 2200/142* (2013.01); *B60G 2204/148* (2013.01); *B60G 2204/182* (2013.01); *B60G 2204/419* (2013.01); *B60G 2300/50* (2013.01); *B60K 2007/0038* (2013.01); *B60K 2007/0046* (2013.01); *B60K 2007/0061* (2013.01)

(56) References Cited

U.S. PATENT DOCUMENTS 7,537,071 B2 * 5/2009 Kamiya .................. B60G 3/20 180/298
7,703,565 B2 * 4/2010 Ikenoya .................. B60G 3/20 180/65.51
7,735,589 B2 * 6/2010 Sugiyama ........... B60K 7/0007 180/55
8,342,612 B2 * 1/2013 Sgherri ............... B60K 7/0007 180/65.51
8,453,774 B2 * 6/2013 Nagaya .................... B60G 3/01 180/65.51
2005/0056471 A1 * 3/2005 Kurata ..................... B60G 3/01 180/65.51
2009/0133944 A1 * 5/2009 Nishioka ................. B60G 3/20 180/65.51
2009/0236158 A1 * 9/2009 Sakuma ............... B60K 7/0007 180/65.51
2015/0158381 A1 * 6/2015 Shin ..................... B60K 17/046 475/149
2016/0052359 A1 * 2/2016 Matayoshi ........... B60K 7/0007 180/65.51

FOREIGN PATENT DOCUMENTS

JP 2008-168804 7/2008
JP 2012-183981 9/2012
JP 2013-226994 11/2013

* cited by examiner

TOWARD OUTSIDE IN VEHICLE WIDTH DIRECTION

TOWARD OUTSIDE IN VEHICLE WIDTH DIRECTION

IN-WHEEL MOTOR DRIVE DEVICE ASSEMBLY HAVING AN IN-WHEEL MOTOR DRIVE DEVICE AND A SUSPENSION DEVICE

TECHNICAL FIELD

The present invention relates to the structure of the inside and the outside of an in-wheel motor drive device.

BACKGROUND ART

An in-wheel motor is disposed in the inside of a wheel. Accordingly, unlike an engine (internal combustion engine), it is unnecessary to mount the in-wheel motor on a vehicle body of the automobile and hence, the in-wheel motor is advantageous with respect to several points including a point that the vehicle can ensure a large inner space in the vehicle body. As a suspension device for mounting the in-wheel motor on a lower side of the vehicle body, conventionally, for example, there have been known a suspension device described in JP-A-2004-090822 (patent literature 1) and a suspension device described in JP-A-2006-240430 (patent literature 2). Patent literature 1 describes the configuration where an in-wheel motor is suspended by a double wishbone type suspension device or a strut type suspension device. Patent literature 2 describes the configuration where an in-wheel motor is suspended by a strut type suspension device.

FIG. 11 shows the connection structure between the in-wheel motor and the suspension device described in patent literature 1. The conventional in-wheel motor 201 includes: a circular cylindrical body 201*b* having a thickness in an axis O direction; and a motor 202 and a wheel support portion 203 projecting from the body 201*b*. The in-wheel motor 201 is disposed in an in-wheel empty region defined by a rim 205 of a wheel 204, and is coaxially joined to a wheel body of the wheel 204 by bolts 206 on one side in the axis O direction. On the other hand, the in-wheel motor 201 has the motor 202 and the wheel support portion 203 on the other side in the axis O direction. An upper end of the wheel support portion 203 is connected to an upper suspension member 208 at a connection point 207, and a lower end of the wheel support portion 203 is connected to a lower suspension member 210 at a connection point 209. The respective connection points 207, 209 are also referred to as hard points, and form ball joints. A straight line which passes the connection points 207, 209 constitutes a steering axis K. The in-wheel motor 201 and the wheel 204 are steered to a rightward direction or a leftward direction about the steering axis K.

CITATION LIST

Patent Literatures

Patent literature 1: JP-A-2004-090822
Patent literature 2: JP-A-2006-240430

SUMMARY OF INVENTION

Technical Problem

In the conventional in-wheel motor 201, a diameter of an outer peripheral surface 201*d* of the body 201*b* is slightly smaller than an inner diameter of the rim 205 and hence, there is substantially no gap between the outer peripheral surface 201*d* and the rim 205. Accordingly, there is no way but to dispose the connection points 207, 209 in a spaced-apart manner from the body 201*b* in the axis O direction. As a result, a distance from a wheel center Cw which is the center of the wheel 204 in the axis O direction to the steering axis K becomes large so that there is a concern that a steering characteristic or a riding comfortability of an electric vehicle is deteriorated. Accordingly, a width (a size in the axis O direction) of the wheel 204 is extremely large.

The increase of the width of the wheel 204 increases a burden in terms of cost. The large distance from the wheel center Cw to the steering axis K is not desirable, so that it is desirable to set the distance from the wheel center Cw to the steering axis K as small as possible, and it is preferable that the wheel center Cw and the steering axis K agree with each other.

The present invention has been made in view of the above-mentioned circumstances, and it is an object of the present invention to provide a connection structure between an in-wheel motor drive device and a suspension device by which a distance from a wheel center Cw to a steering axis K can be decreased.

Solution to Problem

To achieve the above-mentioned object, the present invention provides an in-wheel motor drive device which includes; a wheel hub bearing portion having a wheel hub to be joined with a wheel; a motor portion disposed in an upwardly offset manner with respect to an axis of the wheel hub bearing portion, and configured to drive the wheel hub; a deceleration portion disposed in an upwardly offset manner with respect to the axis of the wheel hub bearing portion, and configured to decelerate a rotation of the motor portion and to transmit the decelerated rotation to the wheel hub; and a carrier projecting downward to a position below the wheel hub bearing portion, wherein a lower suspension connection portion is mounted on a lower end of the carrier, the lower suspension connection portion to be connected with a suspension device so as to be directable in any direction, and the lower suspension connection portion is disposed in an overlapping manner with the wheel hub bearing portion with respect to a position in an axial direction of the wheel hub bearing portion.

According to the present invention, in the in-wheel motor drive device to be housed in a rim of the wheel body, the motor portion and the deceleration portion are disposed on an upper side with respect to the wheel hub bearing portion. Accordingly, it is possible to ensure a space between the wheel hub bearing portion and the rim lower portion of the in-wheel motor drive device (the space being referred to hereinafter as "rim lower portion space"). By disposing the lower suspension connection portion in this rim lower portion space, the rim lower portion space can be effectively used. Further, the lower suspension connection portion can be disposed just below the wheel center of the wheel. Accordingly, the steering axis which passes the lower suspension connection portion can be made to agree with the wheel center or a distance from the wheel center to the steering axis can be made small. The wheel hub bearing portion includes constitutional elements which form the bearing, that is, an outer ring and an inner ring (including a solid shaft) and a plurality of rolling elements disposed in an annular gap defined by the outer ring and the inner ring. In the present invention, "connected so as to be directable in any direction" means that the connection portion can be folded in any direction on a spherical surface like a ball joint or the like. A mechanism which connects one member and the other member to each other such that each member is directable in any direction may be, for example, a ball joint or a joint having different structure. Accordingly, the connection portion is not particularly limited. The lower suspension connection portion may be, for example, a bracket, and is joined to a ball joint. In the present invention, it should be understood that "the lower suspension connection portion is disposed in an overlapping manner with the wheel hub bearing portion" means that at least a portion of the wheel hub bearing portion and at least a portion of the lower suspension connection portion be disposed in the same position in an axial direction.

The carrier is a member mounted on a surface of the in-wheel motor drive device. As one embodiment of the present invention, an upper suspension connection portion to be connected with an upper arm or a strut of the suspension device is provided to an upper end of the carrier, and the lower suspension connection portion is a suspension connection portion to be connected with a lower arm of the suspension device. According to such an embodiment, by connecting the in-wheel motor drive device to a double wishbone type or strut type suspension device, a steering axis of the in-wheel motor drive device can be made to agree with the wheel center of the wheel or a distance from the wheel center to the steering axis can be made small.

As a preferred embodiment of the present invention, the wheel hub bearing portion includes an outer ring which forms the wheel hub, an inner ring disposed on an inner periphery of the outer ring, and a plurality of rolling elements disposed in an annular gap formed between the outer ring and the inner ring. The deceleration portion includes an input gear mounted on a motor rotation shaft of the motor portion, and an output gear mounted coaxially on an outer periphery of the outer ring and driven by the input gear. The lower suspension connection portion disposed at the lower end of the carrier is disposed below a lowermost end of the output gear. According to such an embodiment, the suspension connection portion can be disposed just below the output gear so that the steering axis can be made closer to the wheel center of the wheel. As the more preferred embodiment, the lower suspension connection portion disposed at the lower end of the carrier is disposed just below the output gear.

As another embodiment, the wheel hub bearing portion includes an outer ring which forms the wheel hub, an inner ring disposed on an inner periphery of the outer ring, and a plurality of rolling elements disposed in an annular gap formed between the outer ring and the inner ring, the deceleration portion includes an input gear mounted on a motor rotation shaft of the motor portion, and an output gear mounted coaxially on an outer periphery of a center portion of the outer ring in an axial direction and driven by the input gear. The outer ring has a joining portion to be joined to the wheel on one end portion thereof in an axial direction. The lower suspension connection portion disposed at the lower end of the carrier is disposed in a spaced-apart manner from the output gear on the other side in an axial direction. According to such an embodiment, the output gear having a large diameter can be housed in an inner empty region in the wheel body.

In a preferred embodiment, the output gear is engaged with the outer periphery of the outer ring by spline fitting. According to such an embodiment, the output gear can be engaged with an outer diameter side of the wheel hub coaxially with an axle of the wheel by spline fitting.

In a preferred embodiment, the motor portion is disposed in a spaced-apart manner from an axis of the wheel hub bearing portion in an offset manner. According to such an embodiment, the motor portion is disposed in a spaced-apart manner from the axle in an offset manner. Accordingly, it is possible to ensure a sufficient clearance between the motor portion and a road surface. As another embodiment, the motor portion is disposed such that the motor portion intersects with an axis of the wheel hub bearing portion.

A connection structure between an in-wheel motor drive device and a suspension device according to the present invention includes the above-mentioned in-wheel motor drive device, and a suspension device which connects the in-wheel motor drive device to a vehicle-body-side member. The suspension device includes an upper suspension member which is connected to an upper portion of the in-wheel motor drive device, and a lower suspension member disposed below the upper suspension member. One end of the lower suspension member is connected to a lower suspension connection portion so as to be directable in any direction, the lower suspension connection portion disposed at a lower end of a carrier of the in-wheel motor drive device, and the other end of the lower suspension member is rotatably connected to the vehicle-body-side member.

According to the present invention, it is possible to ensure a rim lower portion space between the wheel hub bearing portion and the rim lower portion of the wheel body of the in-wheel motor drive device. Further, the suspension connection portion can be disposed in the rim lower portion space and hence, the rim lower portion space can be effectively used. Further, the suspension connection portion can be disposed just below the wheel center of the wheel. Accordingly, a steering axis which passes the suspension connection portion can be made to agree with the wheel center, or a distance from the wheel center to the steering axis can be made small.

The suspension device is not particularly limited, and includes a double wishbone type or a strut type suspension device. As a preferred embodiment of the present invention, the suspension device further includes a damper, and the carrier is joined to an end portion of the damper in a relatively non-movable manner. According to such an embodiment, the hub carrier and the damper are rigidly joined to each other.

Advantageous Effects of Invention

In this manner, according to the present invention, compared to a conventional in-wheel motor, the distance from the wheel center of the wheel to the steering axis can be made small. Accordingly, a steering characteristic and a riding comfortability of an electric vehicle can be enhanced.

DESCRIPTION OF EMBODIMENTS

Figure 1:
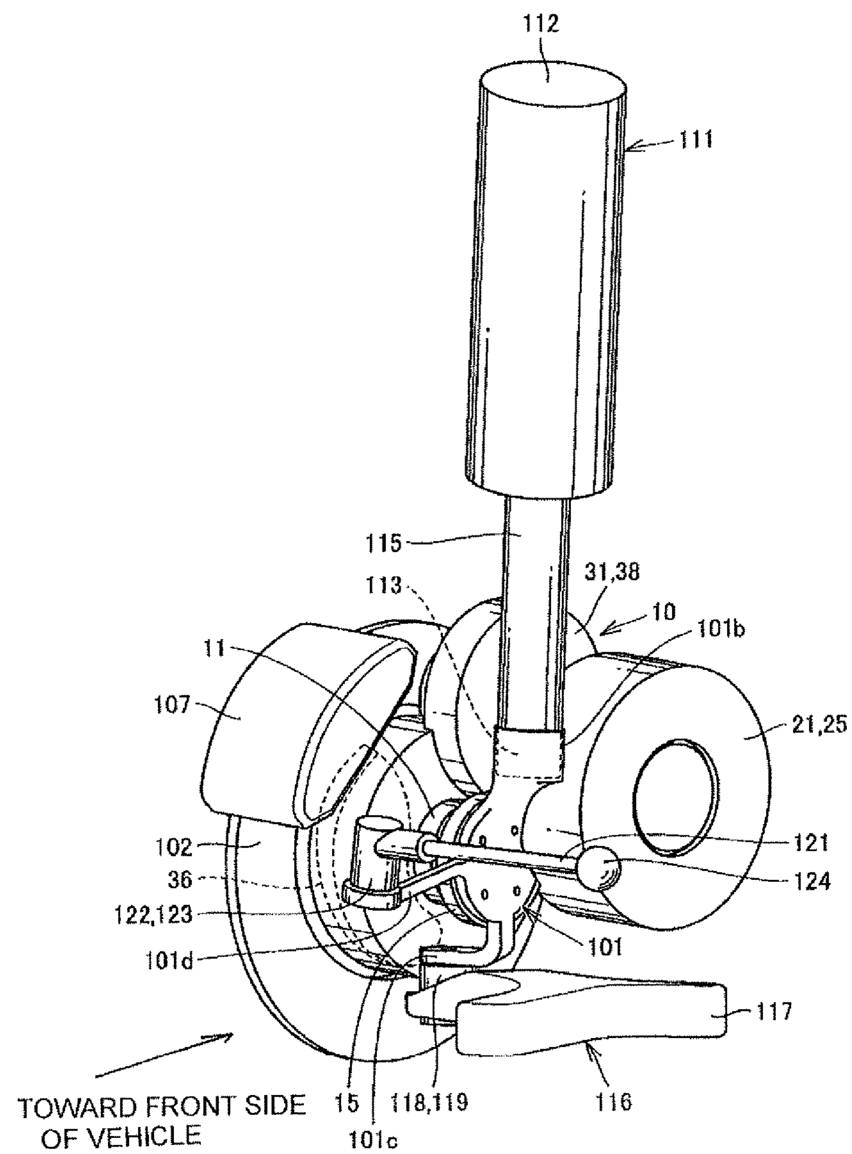
FIG. 1 is a perspective view showing a connection structure between an in-wheel motor drive device and a suspension device according to one embodiment of the present invention.
Figure 2:
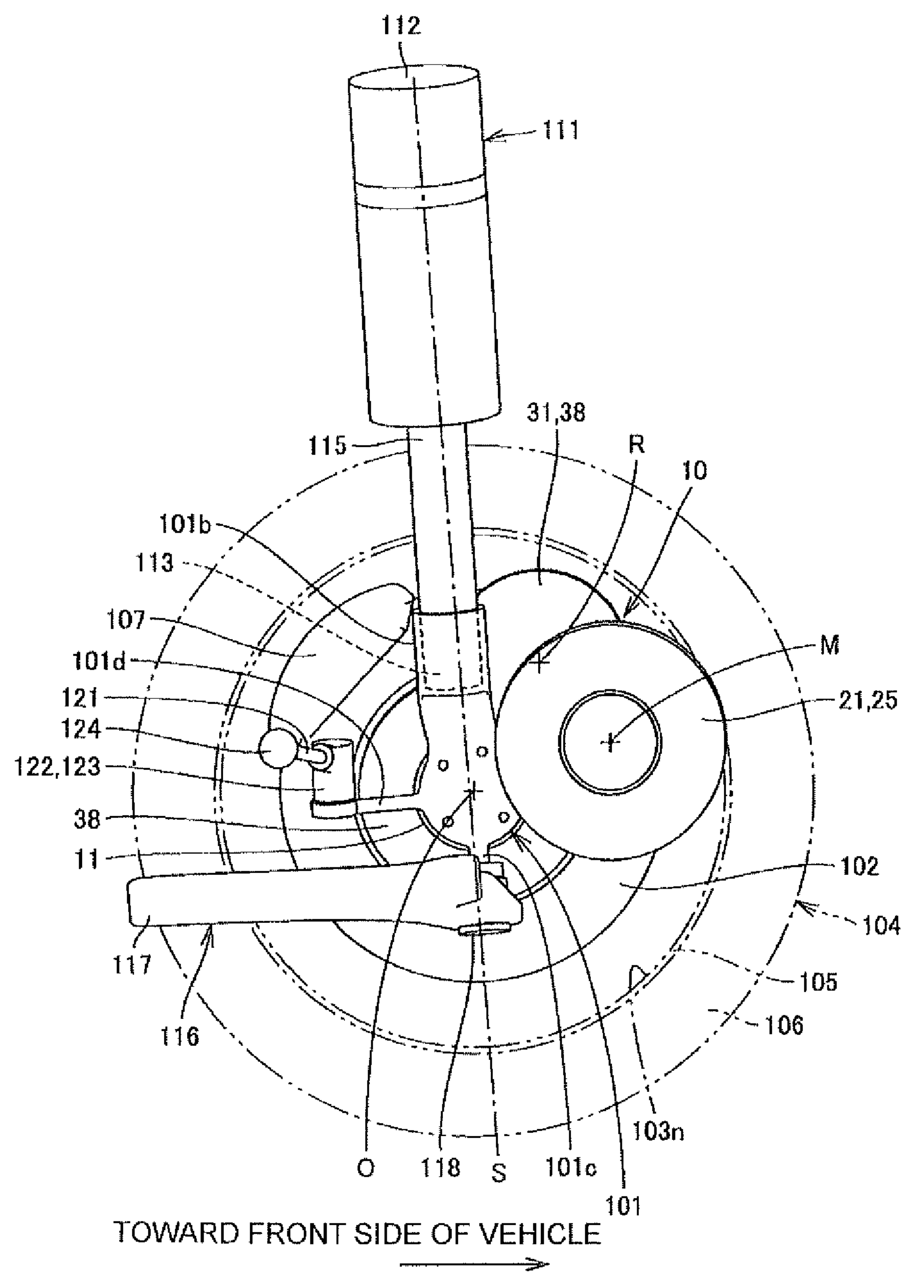
FIG. 2 is a side view showing the connection structure according to the embodiment.
Figure 3:
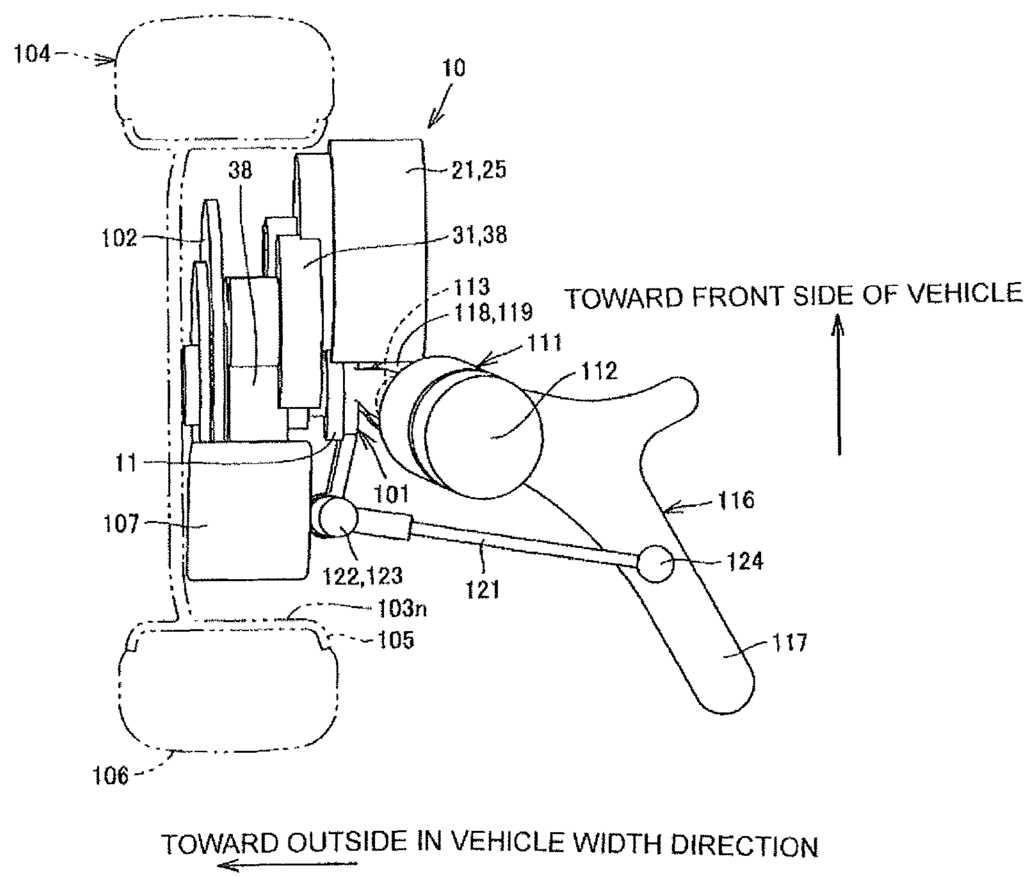
FIG. 3 is a plan view showing the connection structure according to the embodiment.
Figure 4:
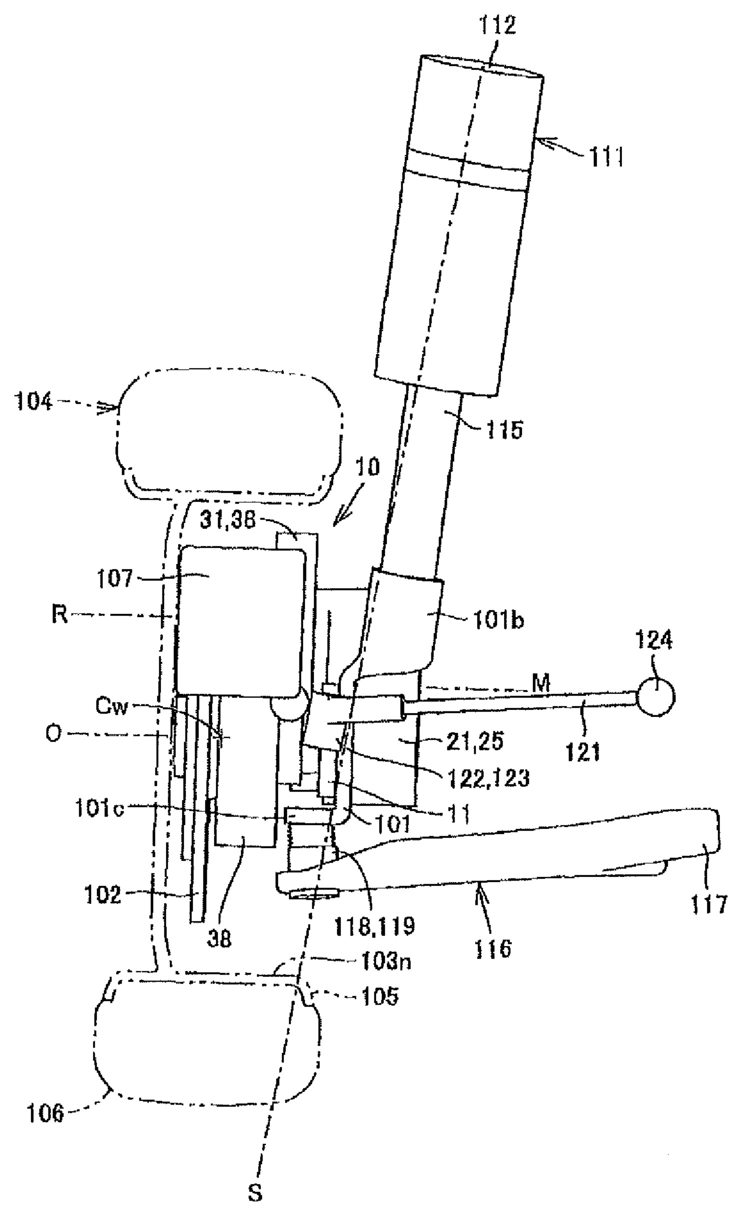
FIG. 4 is a back view showing the connection structure according to the embodiment.

Hereinafter, an embodiment of the present invention is described in detail with reference to the drawings. FIG. 1 is a perspective view showing a connection structure between an in-wheel motor drive device and a suspension device according to one embodiment of the present invention, and also showing a state of the connection structure as viewed obliquely from a position positioned on a rear side of an electric vehicle, in an inner side of the electric vehicle in a vehicle width direction, and above the electric vehicle. FIG. 2 is a side view of the connection structure according to the embodiment showing a state of the connection structure as viewed from the inner side in the vehicle width direction. On a plane on which FIG. 2 is drawn, an upper side shows an upper part of the vehicle, and a lower side shows a lower part of the vehicle. FIG. 3 is a plan view showing the connection structure according to the embodiment. FIG. 4 is a back view of the connection structure according to the embodiment showing a state of the connection structure as viewed from a rear side of the vehicle. FIG. 2 to FIG. 4 correspond to FIG. 1.

In this embodiment, a pair of left and right front wheels and/or a pair of left and right rear wheels of an electric vehicle are driven by respective in-wheel motor drive devices 10. Each in-wheel motor drive device 10 is mounted on a vehicle body of the electric vehicle by way of a strut-type suspension device. The strut-type suspension device includes a strut 111 extending in a vertical direction, and a lower arm 116 extending in a vehicle width direction.

The strut 111 is a shock absorber formed by combining a damper and a spring, and is extensible and retractable in the vertical direction. A range within which the strut 111 can extend and retract is also referred to as a suspension stroke amount of the suspension device. An upper end 112 of the strut 111 is rotatably mounted on a vehicle body not shown. A lower end 113 of the strut 111 is relatively non-movably mounted on and is fixed to an upper portion 101*b* of a carrier 101. Accordingly, the in-wheel motor drive device 10 is neither rotated nor angularly changed with respect to a rod 115 which forms a lower end region of the strut 111. Alternatively, as a modification not shown in the drawings, a suspension device may include a damper as a member separate from the strut 111, and an end portion of the damper according to this modification is joined to the carrier 101 described later.

The lower arm 116 is disposed in a vertically swingable manner such that a vehicle-width-direction inner end 117 of the lower arm 116 is used as a proximal end, and a vehicle-width-direction outer end 118 of the lower arm 116 is used as a free end. The vehicle-width-direction inner end 117 is connected to the vehicle body (not shown) by way of a rotary shaft (not shown) extending in a vehicle longitudinal direction. A ball joint (indicated by symbol 119 in FIG. 7) is incorporated in the vehicle-width-direction outer end 118 of the lower arm 116, and the lower arm 116 is connected to a lower portion of the in-wheel motor drive device 10 by way of the ball joint 119 so as to be directable in any direction. "Directable in any direction" means that the component is directable in any direction on a spherical surface. With reference to FIG. 2, a straight line connecting the vehicle-width-direction outer end 118 of the lower arm 116 and the upper end 112 of the strut 111 to each other constitutes a steering axis S.

As shown in FIG. 2, the in-wheel motor drive device 10 according to this embodiment is disposed in the inside of a wheel 104. The wheel 104 is a well-known vehicle wheel including a wheel body 105, and a tire 106 which is fitted on an outer periphery of the wheel body 105. The wheel 104 is coaxially joined to a wheel hub bearing portion 11, and the wheel 104 and the wheel hub bearing portion 11 have a common axis O.

As shown in FIG. 3 and FIG. 4, the wheel 104 is mounted on and fixed to one end of the wheel hub bearing portion 11 in an axis O direction. The carrier 101 is fixed to the other end of the wheel hub bearing portion 11 in the axis O direction. In the description made hereinafter, an outer side in the vehicle width direction is referred to as one side in the axis direction, and an inner side in the vehicle width direction is referred to as the other side in the axis direction.

Figure 7:
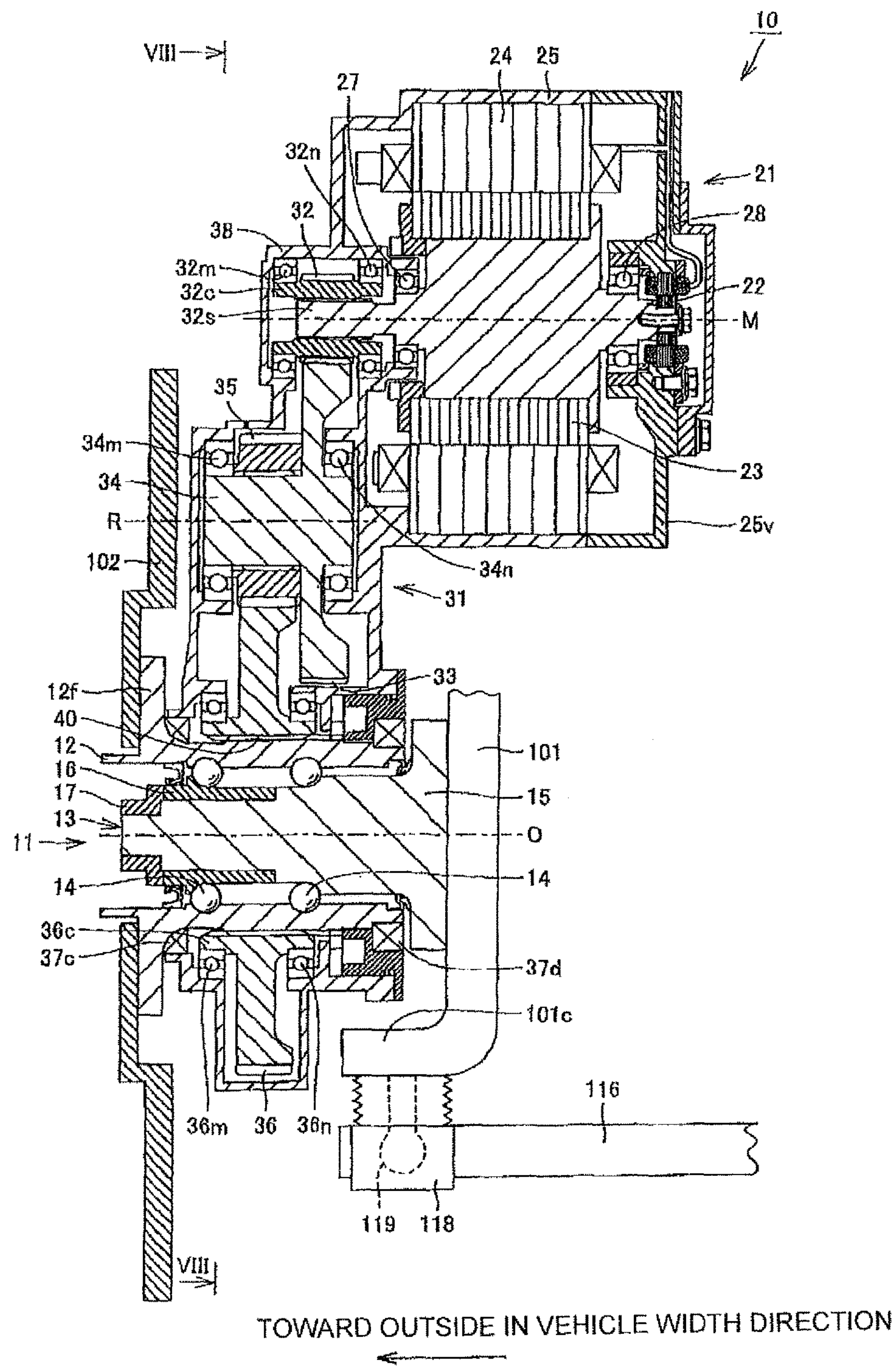
FIG. 7 is a developed cross-sectional view showing the connection structure of the embodiment.

The carrier 101 is also referred to as a hub carrier because the carrier 101 is mounted on the wheel hub bearing portion 11. As shown in FIG. 4, the carrier 101 has an inversed L shape as viewed in a vehicle longitudinal direction. An upper end region of the carrier 101 extends in the vertical direction and is joined to the wheel hub bearing portion 11, and a lower end portion of the carrier 101 changes its direction and extends toward one side in the axis O direction (outward in the vehicle width direction). The lower end portion forms a suspension connection portion (hereinafter, referred to as "lower suspension connection portion 101*c*") to be connected to the lower arm 116. The lower suspension connection portion 101*c* is a bracket to be connected to a ball stud of the ball joint 119 and is made of a steel strip. The ball joint 119 is mounted on the lower suspension connection portion 101*c* in a raised manner (FIG. 7). The ball joint 119 projects downward from the lower suspension connection portion 101*c*, and a lower end of the ball joint 119 is formed into a ball. The lower suspension connection portion 101*c* is described in detail later.

The in-wheel motor drive device 10 includes: the wheel hub bearing portion 11 which is joined to the wheel body 105; a motor portion 21 which drives the wheel 104; and a deceleration portion 31 which decelerates rotation of the motor portion 21 and transmits the decelerated rotation to the wheel hub bearing portion 11. An axis M of the motor portion 21 is disposed in an offset manner from and parallel to the axis O of the wheel hub bearing portion 11. The deceleration portion 31 is a parallel triaxial reduction gear disposed over the axes O, M, R shown in FIG. 2. The deceleration portion 31 incorporates therein an input shaft extending along the axis M, an intermediate shaft (also referred to as a counter shaft) extending along the axis R, and an output shaft extending along the axis O. The axis R of the intermediate shaft is disposed in an offset manner from and parallel to the axis O of the wheel hub bearing portion 11. The internal structure of the in-wheel motor drive device 10 is described in detail later.

The axes O, M, R extend in the vehicle width direction. The positional relationship between the wheel hub bearing portion 11, the motor portion 21 and the deceleration portion 31 as viewed in the vehicle width direction is set as shown in FIG. 2. That is, the axis M of the motor portion 21 is disposed above the axis O of the wheel hub bearing portion 11 in height position. Although a lower portion of the motor portion 21 is disposed lower than the axis O of the wheel hub bearing portion 11 in height position, it is sufficient that the center of the motor portion 21, that is, the axis M be disposed above the axis O. The axis R of the intermediate shaft of the deceleration portion 31 is disposed above the axis M of the motor portion 21 in height position. A height position of a lower portion of the motor portion 21 overlaps with a height position of the vehicle-width-direction outer end 118 of the lower arm 116. However, the vehicle-width-direction outer end 118 is disposed below the motor portion 21.

The axis M of the motor portion 21 is disposed in front of the position of the axis O of the wheel hub bearing portion 11 in the vehicle longitudinal direction. The axis R of the intermediate shaft of the deceleration portion 31 is disposed between the axis O of the wheel hub bearing portion 11 and the axis M of the motor portion 21 in the vehicle longitudinal direction.

As shown in FIG. 1, the motor portion 21 projects inward in the vehicle width direction from the wheel hub bearing portion 11 and the deceleration portion 31. A motor casing 25 which forms an outer shell of the motor portion 21 has a circular cylindrical shape extending in the vehicle width direction. The carrier 101 is spaced apart from the motor casing 25. The in-wheel motor drive device 10 is mounted on the suspension device by the carrier 101.

As shown in FIG. 2, a circular cylindrical side surface of the motor portion 21 is disposed in front of the strut 111 in the vehicle longitudinal direction in a spaced apart manner from the strut 111. Although the wheel hub bearing portion 11 and the deceleration portion 31 are surrounded by a minimum rim inner diameter 103*n*, the motor portion 21 projects more inward in the vehicle width direction than the wheel 104 thus avoiding interference with the wheel body 105. A portion of the motor portion 21 is positioned on a more outer diameter side than a circle having the same diameter as the minimum rim inner diameter 103*n*, and overlaps with the tire 106 as viewed in the vehicle width direction. However, the overlapping portion is positioned on a more inner diameter side than a circle having the same diameter as an outer diameter of the wheel 104.

A brake caliper 107 is mounted and fixed to a body casing 38 of the in-wheel motor drive device 10. The brake caliper 107 applies braking to the wheel 104 with a disc-like brake rotor 102 sandwiched therebetween. As shown in FIG. 2, the brake caliper 107 is disposed above the axis O of the wheel hub bearing portion 11 in height position. The brake caliper 107 is disposed also behind the axis O in the vehicle longitudinal direction. The brake caliper 107, the brake rotor 102, the wheel hub bearing portion 11, and the deceleration portion 31 are housed in an inner space region of the wheel body 105.

A tie rod arm 101*d* is formed on the carrier 101. The tie rod arm 101*d* projects in an outer diameter direction as viewed from the axis O. To be more specific, the tie rod arm 101*d* projects rearward in the vehicle longitudinal direction. A distal end of the tie rod arm 101*d* is connected to a vehicle-width-direction outer end 122 of a tie rod 121 extending in the vehicle width direction by way of a ball joint 123 in such a manner that the distal end of the tie rod arm 101*d* is directable in any direction. The ball joint 123 is incorporated in the vehicle-width-direction outer end 122. A vehicle-width-direction inner end 124 of the tie rod 121 is connected to a steering device not shown in such a manner that the vehicle-width-direction inner end 124 is directable in any direction. Since the tie rod 121 is pushed or pulled in the vehicle width direction by the steering device not shown, the in-wheel motor drive device 10, the wheel 104, and the strut 111 are steered about the steering axis S.

The tie rod 121 which includes the vehicle-width-direction outer end 122 and the ball joint 123 is disposed behind the axis O in the vehicle longitudinal direction.

As shown in FIG. 2, the strut 111 is disposed just above the axis O. The motor portion 21 is disposed in front of the strut 111 in the vehicle longitudinal direction. On the other hand, the brake caliper 107 and the tie rod 121 are disposed behind the strut 111 in the vehicle longitudinal direction.

Next, the in-wheel motor drive device is described in detail with reference to FIG. 5 to FIG. 8.

Figure 5:
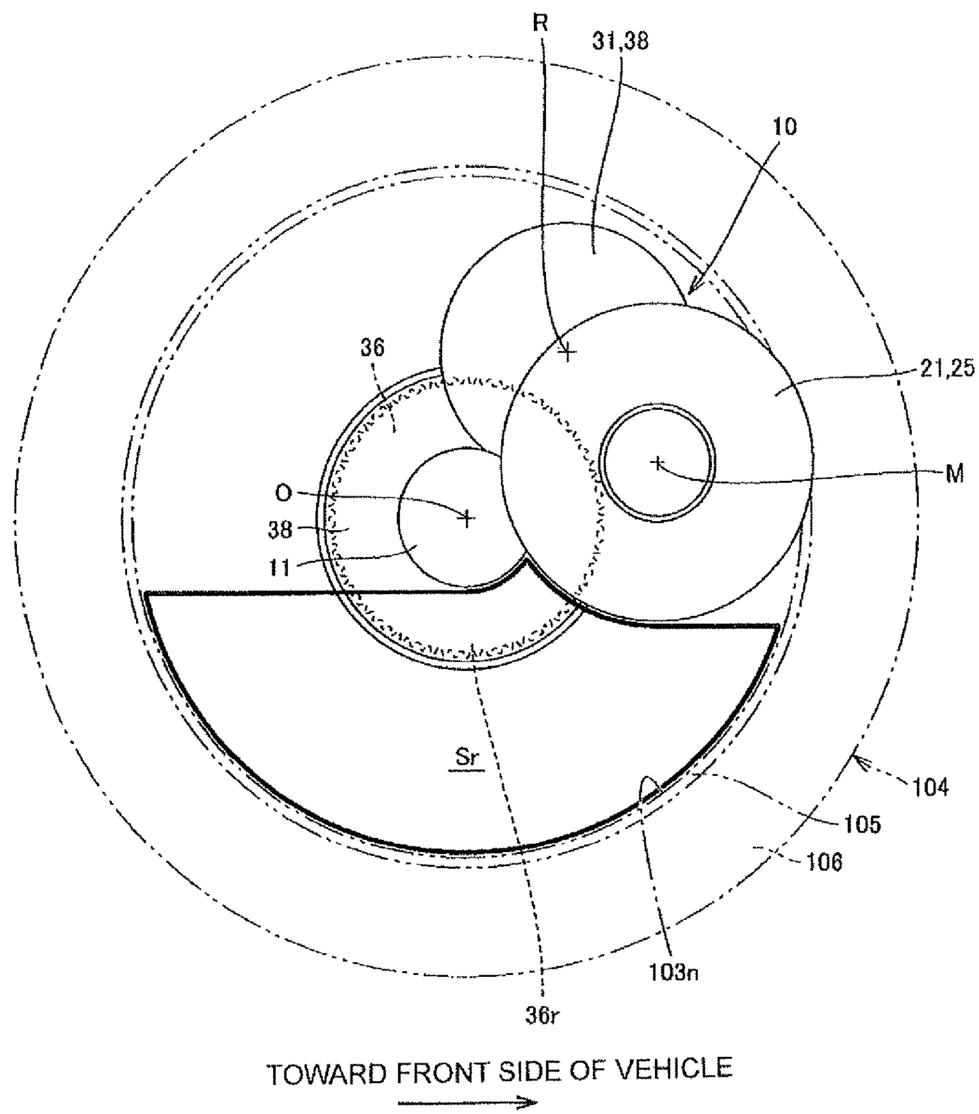
FIG. 5 is a schematic view showing the in-wheel motor drive device according to one embodiment of the present invention together with a wheel.
Figure 6:
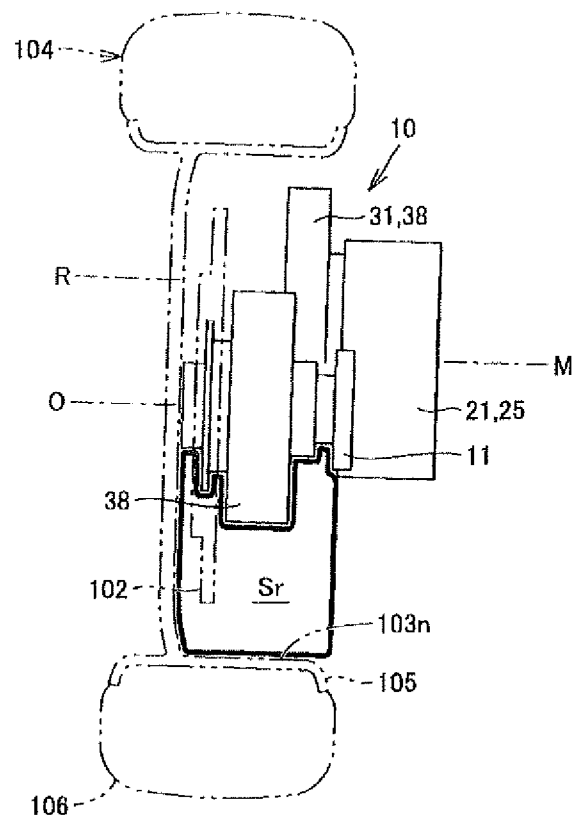
FIG. 6 is a schematic view showing the in-wheel motor drive device according to one embodiment of the present invention together with a wheel.
Figure 8:
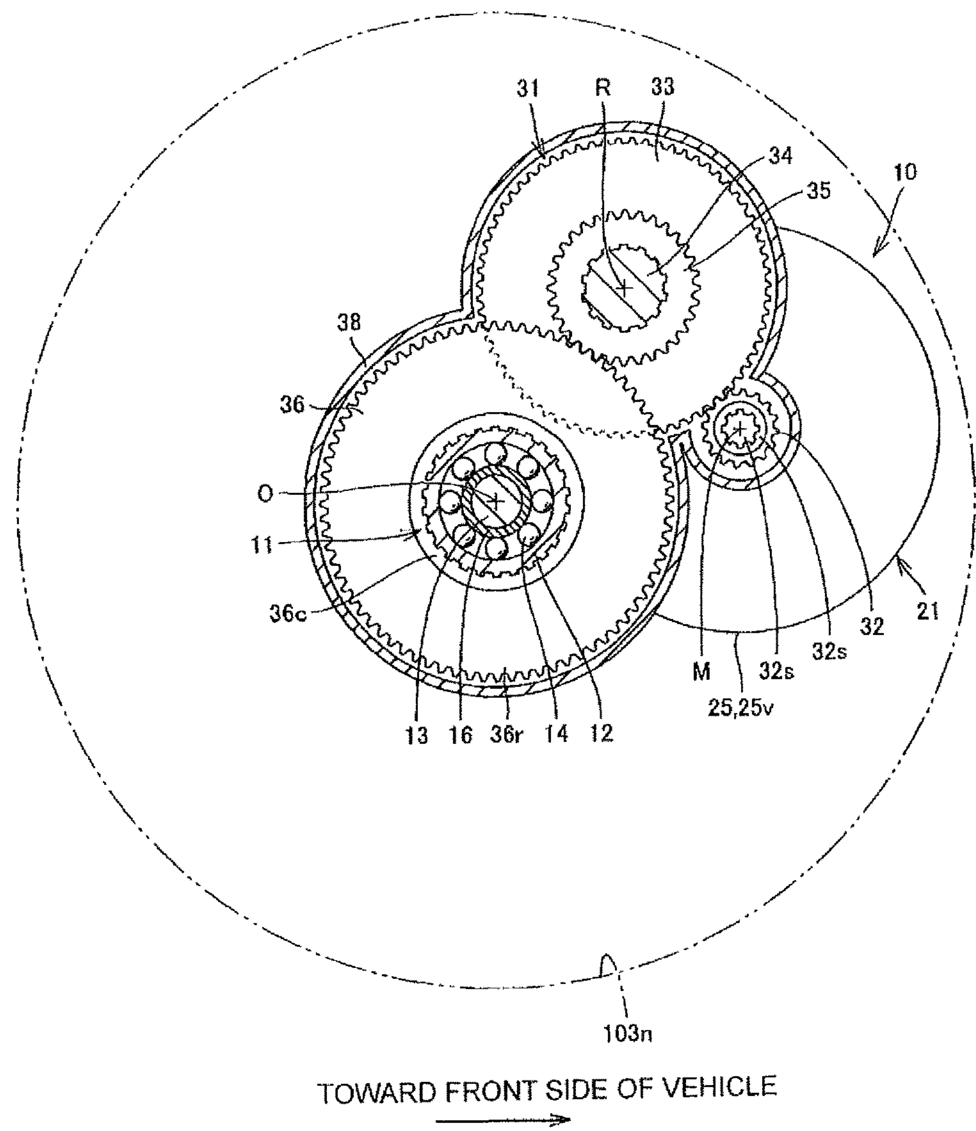
FIG. 8 is a transverse cross-sectional view showing the in-wheel motor drive device according to the embodiment.

FIG. 5 and FIG. 6 are schematic views showing the in-wheel motor drive device according to the embodiment by taking out the in-wheel motor drive device together with the wheel, wherein FIG. 5 shows a state of the in-wheel motor drive device as viewed in an axial direction of the wheel hub bearing portion, and FIG. 6 shows a state of the in-wheel motor drive device as viewed from a front side in the vehicle longitudinal direction. FIG. 7 is a longitudinal cross-sectional view showing the in-wheel motor drive device according to the embodiment. FIG. 8 is a transverse cross-sectional view of the in-wheel motor drive device according to the embodiment. In FIG. 5, FIG. 6 and FIG. 8, the wheel is shown by an imaginary line.

The in-wheel motor drive device 10 includes the wheel hub bearing portion 11, the motor portion 21 which is disposed above the wheel hub bearing portion 11, and the deceleration portion 31 which is disposed above the wheel hub bearing portion 11, decelerates rotation of the motor portion 21, and transmits the decelerated rotation to the wheel hub bearing portion 11.

The in-wheel motor drive device 10 ensures a rim lower portion space Sr between the in-wheel motor drive device 10 and the minimum rim inner diameter 103*n* of the wheel body 105. The rim lower portion space Sr is a space defined between the in-wheel motor drive device 10 and a lower portion of the wheel body 105 within an inner space region of the wheel body 105. To be more specific, the rim lower portion space Sr is a space defined between the wheel hub bearing portion 11 and the lower portion of the wheel body 105.

In this embodiment, for effectively making use of the rim lower portion space Sr, the carrier 101 is made to project downward from the wheel hub bearing portion 11 to the rim lower portion space Sr.

As shown in FIG. 7, the wheel hub bearing portion 11 includes: an outer ring 12 which forms a wheel hub and is joined to a wheel body not shown; an inner fixing member 13 which is disposed in a center hole of the outer ring 12; and a plurality of rolling elements 14 which are disposed in an annular gap formed between the outer ring 12 and the inner fixing member 13. The inner fixing member 13 includes a non-rotatable fixing shaft 15, an inner race 16, and a removal preventing nut 17. The fixing shaft 15 extends along the axis O, and is formed with a small diameter on one side in the axis O direction and with a large diameter on the other side in the axis O direction. The other side of the fixing shaft 15 in the axis O direction is mounted on the carrier 101 in a state where the other side of the fixing shaft 15 is directed inward in the vehicle width direction. The one side of the fixing shaft 15 in the axis O direction is directed outward in the vehicle width direction, and the annular inner race 16 is fitted on an outer periphery of the one side of the fixing shaft 15. The removal preventing nut 17 is threadedly engaged with the one side of the fixing shaft 15 in the axis O direction thus preventing the removal of the inner race 16.

The rolling elements 14 are disposed in plural rows in a spaced-apart manner in the axis O direction. An outer diameter surface of the inner race 16 forms an inner ringway surface of the first-row rolling elements 14, and opposedly faces an inner diameter surface of the outer ring 12 on one side in the axis O direction. On the other hand, an outer periphery of the center portion of the fixing shaft 15 in the axis O direction forms an inner ringway surface of second-row rolling elements 14, and opposedly faces an inner diameter surface of the outer ring 12 on the other side in the axis O direction.

A joining portion 12*f* is formed on one end of the outer ring 12 in the axis O direction. For example, the joining portion 12*f* is a flange, and is coaxially joined to a brake rotor 102 and a wheel not shown in FIG. 7 by a connecting jig such as a bolt. The outer ring 12 is joined to the wheel at the joining portion 12*f* and is rotated integrally with the wheel.

To describe further with respect to the above-mentioned configuration, among the members for transmitting an input load generated in the wheel 104 in forward and backward directions of the vehicle and leftward and rightward in the vehicle width direction, a largest burden is imposed on the lower arm 116 and hence, the lower arm 116 has a large cross-sectional area. Further, to realize zero bump steering, the tie rod 121 has the same length as the lower arm 116 and is disposed in the vicinity of the lower arm 116. Accordingly, it is preferable that the outer ring 12 be disposed above a connecting point between the carrier 101 and the lower arm 116 (the center of the ball joint 119). With such a configuration, it is possible to avoid the interference between the in-wheel motor drive device 10 and the strut 111 and hence, a distance from the motor portion 21 to the lower arm 116 and a distance between the motor portion 21 and the tie rod 121 can be ensured while maintaining an existing suspension stroke amount, and a bending amount of the lower arm 116 for avoiding such an interference can be made small thus minimizing the lowering of a minimum ground clearance of the suspension device.

The motor portion 21 includes a motor rotation shaft 22, a rotor 23, a stator 24, and the motor casing 25, and these components are arranged sequentially in this order from the axis M of the motor portion 21 toward an outer diameter side. Although the motor portion 21 is an inner-rotor outer-stator type radial gap motor, a different type of motor may be adopted as the motor portion 21. For example, although not shown in the drawings, the motor portion 21 may be an axial gap motor.

The axis M which serves as the center of rotation of the motor rotation shaft 22 and the center of rotation of the rotor 23 extends parallel to axis O of the wheel hub bearing portion 11. That is, the motor portion 21 is disposed offset in a spaced-apart manner from the axis O of the wheel hub bearing portion 11. As shown in FIG. 7, the position of the motor portion 21 in the axial direction overlaps with the inner fixing member 13 of the wheel hub bearing portion 11. With such a configuration, a size of the in-wheel motor drive device 10 in the axial direction can be shortened.

Both end portions of the motor rotation shaft 22 are supported on the motor casing 25 in a rotatable manner by way of rolling bearings 27, 28. The motor casing 25 has an approximately circular cylindrical shape, and is integrally joined to the body casing 38 at one end of the motor casing 25 in the axis M direction, and is sealed by a circular cover 25*v* at the other end of the motor casing 25 in the axis M direction. The motor portion 21 drives the outer ring 12.

The deceleration portion 31 includes: an output gear 36 which is coaxially mounted on the outer peripheral surface of the outer ring 12; an input gear 32 which is coaxially joined to the motor rotation shaft 22 of the motor portion 21; an intermediate shaft 34; a plurality of intermediate gears 33, 35 for transmitting rotation from the input gear 32 to the output gear 36; and the body casing 38 which houses these gears therein.

The input gear 32 is a small-diameter external gear, and is formed of a large number of teeth which are formed on an outer periphery of a center portion of a cylindrical portion 32*c* which is disposed along the axis M in an axial direction. An inner periphery of the cylindrical portion 32*c* is fitted in a relatively non-rotatable manner on an outer periphery of a shaft portion 32*s* which further extends from the motor rotation shaft 22 toward one side in the axial direction. Both end portions of the cylindrical portion 32*c* are supported on the body casing 38 in a rotatable manner by way of rolling bearings 32*m*, 32*n*. The body casing 38 covers the deceleration portion 31 and the wheel hub bearing portion 11 such that the body casing 38 surrounds the axes O, M, R extending parallel to each other. The body casing 38 also covers both sides of the deceleration portion 31 in the axial direction. The cylindrical portion 32*c* forms an input shaft of the deceleration portion 31. One end surface of the body casing 38 in the axial direction opposedly faces the brake rotor 102. The other end surface of the body casing 38 in the axial direction is joined to the motor casing 25. The motor casing 25 is attached to the body casing 38, and projects toward the other side in the axial direction from the body casing 38. The body casing 38 houses all rotating elements (shafts and gears) of the deceleration portion 31 therein.

Returning to FIG. 7 to describe this embodiment further, the small-diameter input gear 32 meshes with the first intermediate gear 33 which is a large-diameter external gear. The first intermediate gear 33 is coaxially joined to the second intermediate gear 35 which is a small-diameter external gear by the intermediate shaft 34. Both end portions of the intermediate shaft 34 are rotatably supported on the body casing 38 by way of rolling bearings 34*m*, 34*n*. The first intermediate gear 33 and the second intermediate gear 35 are disposed between the rolling bearing 34*m* and the rolling bearing 34*n* and are disposed adjacently to each other. In this embodiment, the first intermediate gear 33 and the intermediate shaft 34 are integrally formed with each other, and the second intermediate gear 35 is fitted in a relatively non-rotatable manner on an outer periphery of the intermediate shaft 34. The axis R which passes the center of the intermediate shaft 34 extends parallel to the axis O of the wheel hub bearing portion 11. With such a configuration, the deceleration portion 31 is disposed in an offset manner from the wheel hub bearing portion 11. The small-diameter second intermediate gear 35 meshes with the large-diameter output gear 36. The positional relationship between the axes O, R, M is set as shown in FIG. 8.

The output gear 36 is an external gear, and the outer ring 12 is fitted relatively non-rotatably in a center hole of the output gear 36. Such a fitting may be spline fitting (spline grooves 40) or serration fitting. Tooth tips and tooth bottoms of the output gear 36 have a larger diameter than the outer peripheral surface of the outer ring 12. The outer peripheral portion of the output gear 36 and an outer peripheral portion of the first intermediate gear 33 overlap with each other as viewed in the axis O direction. A cylindrical portion 36*c* is formed on the center of the output gear 36. Both end portions of the cylindrical portion 36*c* project from both end surfaces of the output gear 36 respectively, and are rotatably supported on the body casing 38 by way of rolling bearings 36*m*, 36*n* respectively. The cylindrical portion 36*c* which is fitted on the outer ring 12 forms an output shaft of the deceleration portion 31.

An opening which allows the outer ring 12 to pass therethrough is formed respectively in both ends of the body casing 38 in the axial direction. In the respective openings, seal materials 37*c*, 37*d* for sealing an annular gap between the body casing 38 and the outer ring 12 are disposed. Accordingly, the outer ring 12 which forms a rotary element is covered by the body casing 38 except for both ends of the outer ring 12 in the axis O direction. In other words, the wheel hub bearing portion 11 is housed in the body casing 38 except for both end portions of the wheel hub bearing portion 11. The body casing 38 is disposed over the three axes O, R, M extending parallel to each other.

As shown in FIG. 8, the first intermediate gear 33, the second intermediate gear 35, and the intermediate shaft 34 are disposed on a more outer diameter side than the outer ring 12. As shown in FIG. 7, the first intermediate gear 33, the second intermediate gear 35, and the intermediate shaft 34 are disposed such that the first intermediate gear 33, the second intermediate gear 35, and the intermediate shaft 34 overlap with the position of the outer ring 12 in the axis O direction. The input gear 32 and the output gear 36 are also disposed such that the input gear 32 and the output gear 36 overlap with the position of the outer ring 12 in the axis O direction. In this embodiment, as shown in FIG. 8, the whole first intermediate gear 33 and the whole second intermediate gear 35 are disposed on a more outer diameter side than the outer ring 12. Alternatively, as a modification not shown in the drawings, the large-diameter first intermediate gear 33 may be spaced apart from the small-diameter second intermediate gear 35 by largely extending the intermediate shaft 34 so that the outer periphery of the first intermediate gear 33 be disposed in an overlapping manner with the outer ring 12 as viewed in the axis O direction.

Returning to FIG. 7 to describe this embodiment further, the output gear 36 is disposed in an axial direction region from the position of the center of the rolling elements 14 disposed in a most one side row in the axis O direction to the position of the center of the rolling elements 14 disposed in a most other side row in the axis O direction. With such a configuration, the outer ring 12 is supported in a stable manner on the plural rows of rolling elements 14, 14 during driving of the wheel.

As shown in FIG. 8, the motor portion 21 and the deceleration portion 31 are disposed within the minimum rim inner diameter 103*n* of the wheel body joined to the outer ring 12. To be more specific, the output gear 36 is disposed within the minimum rim inner diameter 103*n*. With such a configuration, the motor portion 21 and the deceleration portion 31 can be housed in the wheel body.

To describe further with respect to the above-mentioned configuration, as shown in FIG. 6, the wheel hub bearing portion 11, the deceleration portion 31, and one end of the motor portion 21 in the axial direction are housed in the inner space region of the wheel body. On the other hand, the other end of the motor portion 21 in the axial direction projects from the inner space region of the wheel body. Alternatively, as a modification not shown in the drawings, the other end of the motor portion 21 in the axial direction may be housed in the inner space region of the wheel body.

The axis R and the axis M are disposed above the axis O. With such a configuration, a clearance from a road surface to the motor portion 21 and a clearance from the road surface to the deceleration portion 31 can be easily ensured.

In this embodiment, as shown in FIG. 5 and FIG. 6, the motor portion 21 is disposed above the wheel hub bearing portion 11, and also the deceleration portion 31 is disposed above the wheel hub bearing portion 11 and hence, the large rim lower portion space Sr can be ensured below the in-wheel motor drive device 10 compared to the conventional in-wheel motor.

The carrier 101 of the in-wheel motor drive device 10 is mounted on the other end of the wheel hub bearing portion 11 in the axial direction, and projects into the rim lower portion space Sr. In this embodiment, as shown in FIG. 7, the lower suspension connection portion 101*c* is disposed in the rim lower portion space Sr in a spaced-apart manner from the output gear 36 toward the other side in the axis O direction. With such a configuration, the lower portion of the in-wheel motor drive device 10 can be connected to the lower arm 116 of the suspension device by making use of the rim lower portion space Sr. According to this embodiment, as shown in FIG. 4, the steering axis S can be disposed on a more outer side in the vehicle width direction compared to the prior art so that the steering axis S can be disposed close to a wheel center Cw. In this embodiment, although the lower suspension connection portion 101*c* is disposed at the same height as the lower portion of the output gear 36, as a modification not shown in the drawings, the lower suspension connection portion 101*c* may be disposed at the position lower than the lower portion of the output gear 36.

According to this embodiment, as shown in FIG. 4, the in-wheel motor drive device 10 includes the carrier 101. The lower suspension connection portion 101*c* to be connected to the lower arm 116 of the suspension device is formed on a lower end of the carrier 101. Accordingly, in mounting the in-wheel motor drive device 10 on the suspension device, the steering axis S can be disposed close to the wheel center Cw compared to the prior art. To focus on a tire ground contact surface which forms a lower portion of the tire 106, the steering axis S and the tire ground contact surface (not shown) intersect with each other. A straight line (not shown) which extends vertically from the wheel center Cw intersects with the tire ground contact surface (not shown), and such an intersecting point (not shown) exists on the steering axis S. Accordingly, a moment around the steering axis S generated by a driving force can be reduced thus preventing the occurrence of torque steering.

According to this embodiment, as shown in FIG. 7, the wheel hub bearing portion 11 includes: the outer ring 12 which includes the joining portion 12*f*, the inner fixing member 13 which forms the inner ring and is made to pass through the center hole of the outer ring 12; and the plurality of rolling elements 14 which are disposed in the annular gap formed between the outer ring 12 and the inner fixing member 13. The deceleration portion 31 includes: the input gear 32 which is mounted on the motor rotation shaft 22 of the motor portion 21; and the output gear 36 which is mounted on the outer periphery of the outer ring 12. With respect to the position in the axis O direction, the lower suspension connection portion 101*c* formed on the lower end of the carrier 101 is disposed on the other side in the axis O direction in a spaced-apart manner from the output gear 36. With such a configuration, the arrangement space for the large-diameter output gear 36 and the arrangement space for connecting the carrier 101 to the lower arm 116 can be ensured in the rim lower portion space Sr.

Next, the connection structure between an in-wheel motor drive device and a strut-type suspension device according to another embodiment of the present invention is described.

Figure 9:
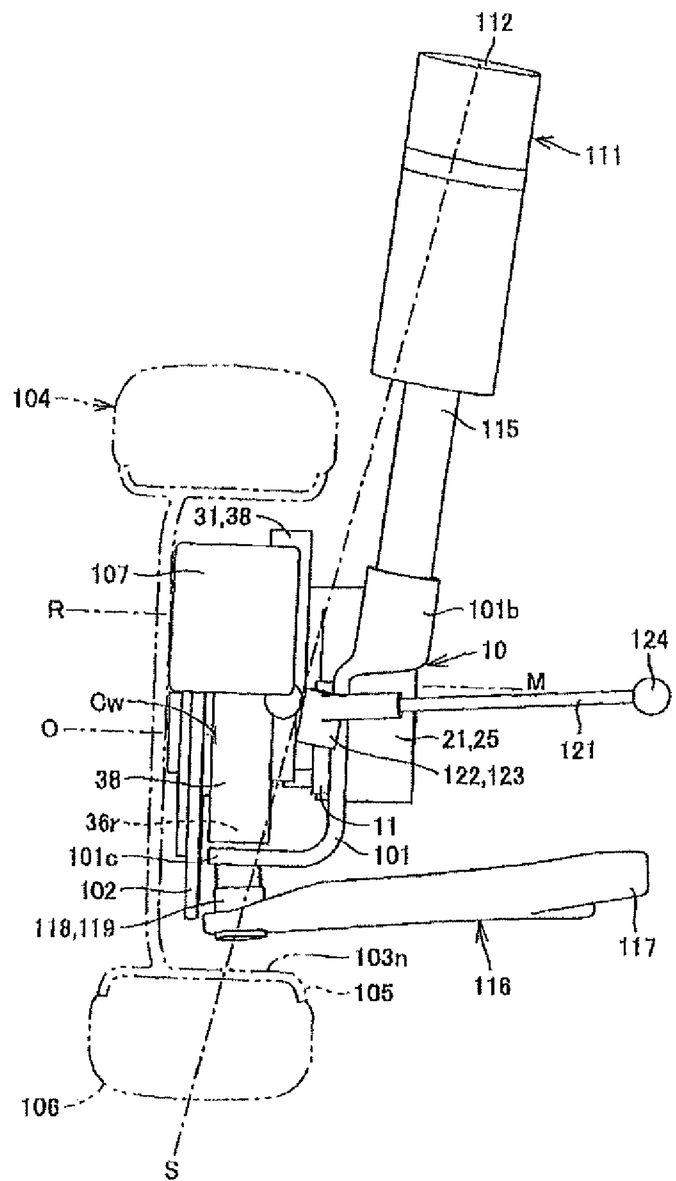
FIG. 9 is a back view showing a connection structure according to another embodiment of the present invention.
Figure 10:
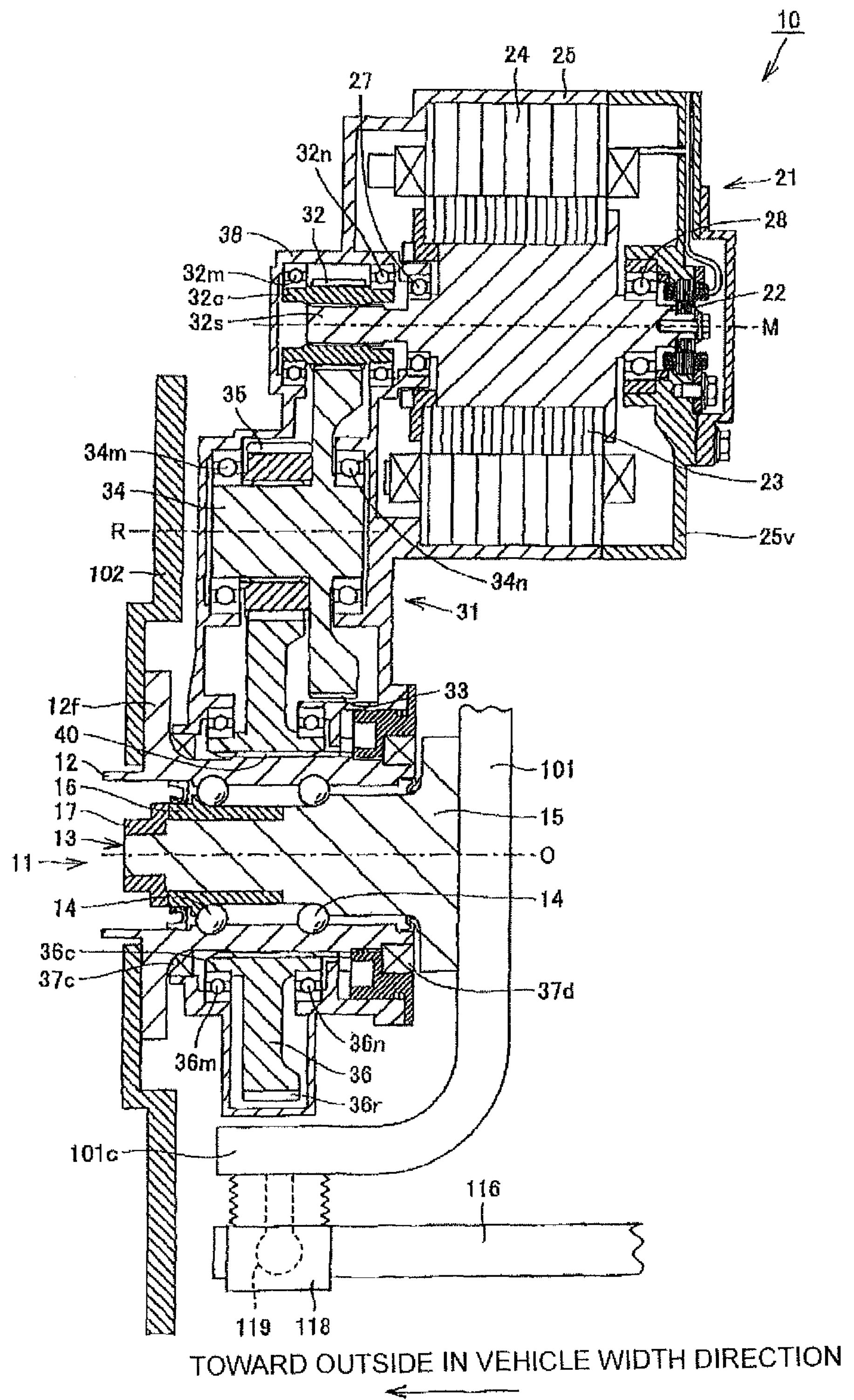
FIG. 10 is a developed cross-sectional view showing the connection structure between an in-wheel motor drive device and a suspension device according to another embodiment.
Figure 11:
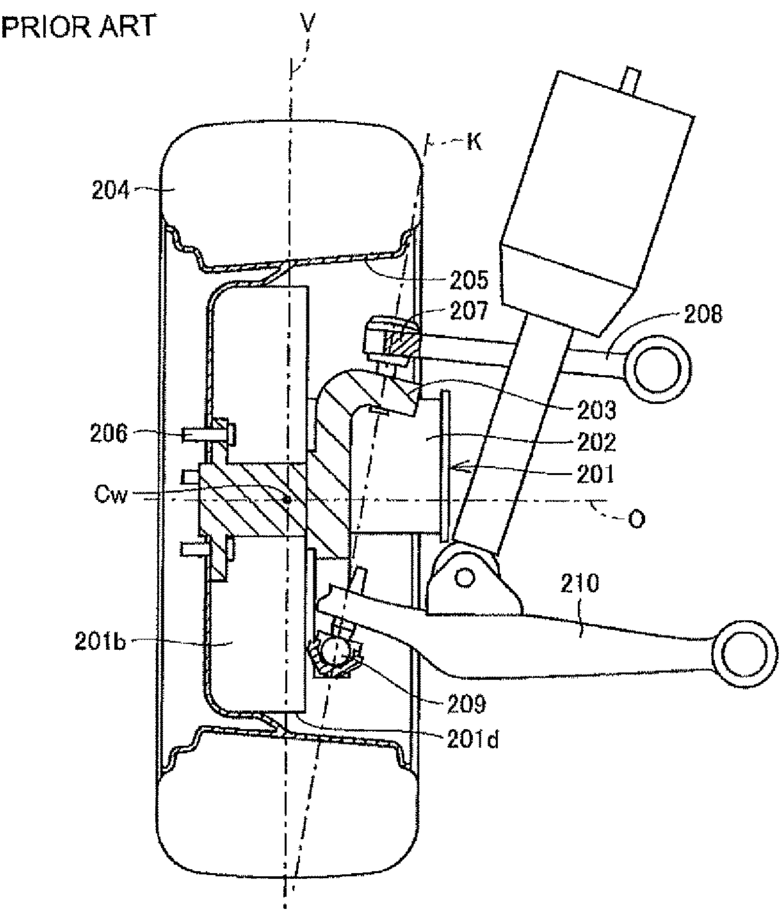
FIG. 11 is a back view showing a conventional example of a connection structure between an in-wheel motor drive device and a suspension device.

FIG. 9 is a back view showing the connection structure between the in-wheel motor drive device and the suspension device according to the other embodiment of the present invention. FIG. 9 also shows a state of the connection structure as viewed from a rear side of a vehicle. FIG. 10 is a developed cross-sectional view showing the in-wheel motor drive device according to this embodiment. In the other embodiment, constitutional elements substantially equal to the corresponding constitutional elements of the above-mentioned embodiment are given the same symbols and their repeated description is omitted, and constitutional elements different from the constitutional elements of the above-mentioned embodiment are described hereinafter. An output gear 36 is incorporated in a body casing 38. In the other embodiment, a lower suspension connection portion 101*c* and a ball joint 119 on a lower end of a carrier 101 are disposed lower than a lowermost end 36*r* of the output gear 36. With respect to the position of a wheel hub bearing portion 11 in an axis O direction, the position of the lower suspension connection portion 101*c* in the axis O direction and the position of the ball joint 119 in the axis O direction overlap with the position of the output gear 36 in the axis O direction.

According to the other embodiment, the ball joint 119 is positioned on a more outer side in the vehicle width direction than the ball joint 119 described in the above-mentioned embodiment. Accordingly, the steering axis S can be disposed closer to the wheel center Cw compared to the above-mentioned embodiment.

Although the embodiments of the present invention have been described with reference to the drawings heretofore, the present invention is not limited to the embodiments shown in the drawings. With respect to the embodiments shown in the drawings, various modifications and changes are conceivable within the scope of the present invention and within the scope equivalent to the scope of the present invention.

INDUSTRIAL APPLICABILITY

The in-wheel motor drive device according to the present invention is effectively used in an electric vehicle and a hybrid vehicle.

REFERENCE SIGNS LIST

10 in-wheel motor drive device
11 wheel hub bearing portion
12 outer ring
12*f* joining portion
13 inner fixing member
14 rolling element
15 fixing shaft
16 inner race
21 motor portion
22 motor rotation shaft
23 rotor
24 stator
25 motor casing
25*v* cover
31 deceleration portion
32 input gear
32*c*, 36*c* cylindrical portion
33 first intermediate gear
35 second intermediate gear
36 output gear
36*r* lowermost end of output gear
37*c*, 37*d* seal material
38 body casing
40 spline groove
101 carrier
101*c* (lower) suspension connection portion
102 brake rotor
103*n* minimum rim inner diameter
104 wheel
105 wheel body
106 tire
107 brake caliper
111 strut
112 strut upper end
113 strut lower end
115 rod
116 lower arm
117 inner end in vehicle width direction
118 outer end in vehicle width direction
119, 123 ball joint (connecting point)
121 tie rod
122 outer end in vehicle width direction
124 inner end in vehicle width direction
Cw wheel center
M, O, R axis
S steering axis
Sr rim lower portion space

The invention claimed is:

1. An in-wheel motor drive device assembly comprising:

an in-wheel motor drive device having a wheel hub bearing portion having a wheel hub to be joined with a wheel; a motor portion disposed in an upwardly offset manner with respect to an axis of the wheel hub bearing portion, and configured to drive the wheel hub; a deceleration portion disposed in an upwardly offset manner with respect to the axis of the wheel hub bearing portion, and configured to decelerate a rotation of the motor portion and to transmit the decelerated rotation to the wheel hub; and a carrier projecting downward to a position below the wheel hub bearing portion, a suspension device which connects the in-wheel motor drive device to a vehicle-body-side member, wherein the suspension device includes:

a damper, a lower suspension member disposed below the damper, an upper suspension connection portion, the upper suspension connection portion provided at an upper end of the carrier and joined to an end portion of the damper in a non-movable manner, and a lower suspension connection portion, the lower suspension connection portion mounted on a lower end of the carrier, the lower suspension connection portion to be connected with one end of the lower suspension device so as to be directable in any direction, wherein the lower suspension connection portion is disposed in an overlapping manner with the wheel hub bearing portion with respect to a position in an axial direction of the wheel hub bearing portion.

2. The in-wheel motor drive device assembly according to claim 1, wherein the wheel hub bearing portion includes an outer ring which forms the wheel hub, an inner ring disposed on an inner periphery of the outer ring, and a plurality of rolling elements disposed in an annular gap formed between the outer ring and the inner ring, the deceleration portion includes an input gear mounted on a motor rotation shaft of the motor portion, and an output gear mounted coaxially on an outer periphery of the outer ring and driven by the input gear, and the lower suspension connection portion is disposed below a lowermost end of the output gear.

3. The in-wheel motor drive device assembly according to claim 1, wherein the wheel hub bearing portion includes an outer ring which forms the wheel hub, an inner ring disposed on an inner periphery of the outer ring, and a plurality of rolling elements disposed in an annular gap formed between the outer ring and the inner ring, the deceleration portion includes an input gear mounted on a motor rotation shaft of the motor portion, and an output gear mounted coaxially on an outer periphery of a center portion of the outer ring in an axial direction and driven by the input gear, the outer ring has a joining portion to be joined to the wheel on one end portion thereof in an axial direction, and the lower suspension connection portion is disposed in a spaced-apart manner from the output gear on the other side in an axial direction.

4. The in-wheel motor drive device assembly according to claim 2, wherein the output gear is engaged with the outer periphery of the outer ring by spline fitting.

5. The in-wheel motor drive device assembly according to claim 1 wherein the motor portion is disposed in a spaced-apart manner from the axis of the wheel hub bearing portion in an offset manner.

* * * * *